US012025491B2

United States Patent
Lysov et al.

(10) Patent No.: US 12,025,491 B2
(45) Date of Patent: Jul. 2, 2024

(54) OPTOELECTRONIC SENSOR DEVICE, DETECTOR AND ELECTRONIC DEVICE, AND METHOD OF OPERATING SUCH A SENSOR DEVICE OR DETECTOR

(71) Applicant: ams-OSRAM International GmbH, Regensburg (DE)

(72) Inventors: Andrey Lysov, Regensburg (DE); Tim Boescke, Regensburg (DE)

(73) Assignee: AMS-OSRAM INTERNATIONAL GMBH, Regensburg (DE)

( * ) Notice: Subject to any disclaimer, the term of this patent is extended or adjusted under 35 U.S.C. 154(b) by 70 days.

(21) Appl. No.: 17/801,533

(22) PCT Filed: Feb. 23, 2021

(86) PCT No.: PCT/EP2021/054422
§ 371 (c)(1),
(2) Date: Aug. 23, 2022

(87) PCT Pub. No.: WO2021/170570
PCT Pub. Date: Sep. 2, 2021

(65) Prior Publication Data
US 2023/0131042 A1    Apr. 27, 2023

(30) Foreign Application Priority Data
Feb. 25, 2020   (DE) .................. 10 2020 202 400.6

(51) Int. Cl.
*G01J 1/02*   (2006.01)
(52) U.S. Cl.
CPC ........... *G01J 1/0295* (2013.01); *G01J 1/0219* (2013.01)

(58) Field of Classification Search
CPC ...... G01J 1/0295; G01J 1/0219; G01J 1/4204; H04N 23/745; H05B 47/11
See application file for complete search history.

(56) References Cited

U.S. PATENT DOCUMENTS

| 2005/0177372 A1 | 8/2005 | Wang et al. |
| 2006/0054783 A1 | 3/2006 | Voronov et al. |

(Continued)

FOREIGN PATENT DOCUMENTS

| CN | 1315110 C | 5/2007 |
| CN | 101300825 A | 11/2008 |

(Continued)

OTHER PUBLICATIONS

International Search Report issued for the corresponding international patent application No. PCT/EP2021/054422, dated Apr. 30, 2021, 2 pages (for informational purposes only).

(Continued)

*Primary Examiner* — David P Porta
*Assistant Examiner* — Meenakshi S Sahu
(74) *Attorney, Agent, or Firm* — VIERING, JENTSCHURA & PARTNER mbB

(57) ABSTRACT

An optoelectronic sensing device may include an optoelectronic detection device configured to detect light and provide an electrical signal as a function of detected light. The device may further include a signal detection device configured to store at least one signal value of the electrical signal in a memory during a time interval of repeating time intervals and to output an indication signal after the time interval has elapsed.

19 Claims, 3 Drawing Sheets

(56) References Cited

U.S. PATENT DOCUMENTS

| | | | |
|---|---|---|---|
| 2009/0310003 A1 | 12/2009 | Collins et al. | |
| 2011/0157415 A1* | 6/2011 | Goh ..................... | H04N 23/745 |
| | | | 348/226.1 |
| 2018/0348051 A1* | 12/2018 | Safaee ................. | H04N 23/745 |
| 2020/0137283 A1 | 4/2020 | Hamaguchi et al. | |

FOREIGN PATENT DOCUMENTS

| | | |
|---|---|---|
| CN | 102668542 A | 9/2012 |
| CN | 110546469 A | 12/2019 |
| EP | 0519105 A1 | 12/1992 |
| EP | 3557767 A1 | 10/2019 |
| WO | 0007363 A1 | 2/2000 |
| WO | 2007049900 A1 | 5/2007 |
| WO | 2018226516 A1 | 12/2018 |

OTHER PUBLICATIONS

German Search Report issued for the corresponding german patent application No. 10 2020 202 400.6, dated Oct. 28, 2020, 6 pages (for informational purposes only).

* cited by examiner

OPTOELECTRONIC SENSOR DEVICE, DETECTOR AND ELECTRONIC DEVICE, AND METHOD OF OPERATING SUCH A SENSOR DEVICE OR DETECTOR

CROSS-REFERENCE TO RELATED APPLICATIONS

The present application is a national stage entry according to 35 U.S.C. § 371 of PCT application No.: PCT/EP2021/054422 filed on Feb. 23, 2021; which claims priority to German Patent application No.: 10 2020 202 400.6, filed on Feb. 25, 2020; all of which are incorporated herein by reference in their entirety and for all purposes.

TECHNICAL FIELD

The present disclosure relates to an optoelectronic sensor device, a detector, an electronic device such as a smartphone, and methods for operating such a sensor device or detector.

BACKGROUND

Optoelectronic sensor devices which detect light, for example by means of one or more photodiodes, and which output an electrical signal, in particular an electrical current and/or an electrical voltage, as a function of the detected light, find numerous applications in various technical products. One example is the use of optoelectronic sensor devices for detecting the so-called flickering of electrically operated light sources.

Power grids are typically clocked at a mains frequency of 50 hertz (Hz), 60 Hz, or some other frequency. Light sources that are operated with electricity from a power grid therefore tend to flicker. The flickering frequency is usually twice the mains frequency. Flickering can lead to distortions in images taken with cameras, especially CMOS-based cameras, for example in smartphones or industrial applications, if the image area is illuminated with a flickering light source. CMOS here stands for Complementary Metal-Oxide-Semiconductor. In CMOS-based cameras with a rotating aperture, also known as a rolling shutter, flickering light can lead to the formation of horizontal stripes with fluctuating brightness in the image, especially if the image capture frequency is not a divisor or multiple of the flickering frequency. The phenomenon of horizontal bands of fluctuating brightness in captured images is also known as banding. The banding problem can be solved by synchronizing the image capture frequency with the flicker frequency. To do this, the flicker frequency must be extracted from the light.

Sensors are known from the prior art that allow detection of the flicker frequency.

For example, the VD6281 sensor from STMicroelectronics allows a flicker frequency to be determined. In addition, a sampled light signal can be output as a bit sequence via an output.

The TCS3707 sensor from AMS AG features an integrated flicker detector that allows flicker detection at 50 Hz or 60 Hz. The sensor outputs a specific signal when a flicker frequency has been detected at the mentioned frequencies.

The TMD 49103S sensor from AMS AG also features an integrated flicker detector that allows flicker detection at 50 Hz or 60 Hz. Furthermore, the sensor outputs a signal when a flicker frequency has been detected at the mentioned frequencies. The sensor has an integrated buffer memory that operates according to the FIFO principle. FIFO stands for "first in—first out". This means that the element that was stored first is also taken out of the memory first. Measured values of the measured light intensity are stored in the buffer memory. These measured values can be read out via an I2C interface, which is also referred to as an I2C interface. By further processing of the read-out measured values, flicker frequencies other than 50 Hz or 60 Hz can also be determined.

Other applications of light sensors besides the determination of flicker frequencies are also conceivable, such as the detection of light intensity fluctuations.

SUMMARY

The present disclosure is based on the objective to provide an optoelectronic sensor device which can be manufactured compactly and inexpensively and which, in particular, offers a wide range of possible applications.

An optoelectronic sensor device comprises an optoelectronic detection device which has a detector surface for detecting light, and which provides an electrical signal in dependence on detected light detected by means of the detector surface. The sensor device further comprises a signal detection device which is adapted to store at least one signal value of the electrical signal in a memory during a time interval of repetitive time intervals and to output an indication signal after the time interval has elapsed.

The display signal can be used to signal that the at least one signal value can be read.

In embodiments, exactly one signal value is stored in the memory per time interval. However, alternative embodiments may also be used in which a number of signal values are stored in the memory per time interval. The number may correspond to a natural number, for example 2, 3, 4 or even more, of signal values.

The optoelectronic detection device may have one or more photodiodes, for example an array of photodiodes, which can absorb incident light and convert it into an electric current. The electric current may be dependent on the intensity of the incident light. The detection device may comprise at least one analog-to-digital converter that generates a signal value from the electric current, which in particular depends on the electric current and thus on the light intensity. The signal value may correspond to a measured value that is dependent on the detected light intensity. During a time interval, several such signal values can be determined with a time delay, thus reflecting the course of the electrical signal. In order to carry out a measurement process, the sensor requires a certain integration time. If several measurements are carried out consecutively, the temporal course can be mapped by the optical input signal.

After the time interval, which may correspond to an integration time, has elapsed, the display signal is output. This serves as a signal, for example for a control device connected to the sensor device, to indicate that the time interval has ended and the signal value determined during the time interval or the integration time can be read out from the memory. The control device can then communicate with the sensor device via a communication interface and read out the signal value that was stored during the time interval.

After completion of a first time interval and thus a measuring process, the next measuring process starts in a subsequent, second time interval. In addition, the measured value measured in the first time interval is read out. After completion of the readout process, the at least one signal value acquired during the subsequent, second time interval can then be stored. The at least one signal value determined during the first time interval can be overwritten or deleted immediately after the aforementioned readout process. In particular, as soon as the first byte of the measured value is or is read out, the display signal can no longer be displayed on the interrupt output.

The sensor device may store only one signal value in the memory during the, in particular definable, time interval. The signal value can consist of several bytes. A signal value corresponds to a digital value of the optical signal detected at a specific time within the time interval. Several successive signal values, which are detected in particular in successive time intervals, therefore reflect the temporal course of the optical signal. After the time interval has elapsed, the sensor device can signal by means of the display signal that the at least one detected signal value can be read out. The read-out data can then be further processed by another device, for example a control device in communication with the sensor device. In this case, the read-out signal values can be used, for example, to determine a flicker frequency of the detected light.

Since no storage of the signal values over several time intervals is provided in the sensor device, but only the at least one, such as exactly one signal value detected during a time interval is stored, the memory can be kept small. For example, the memory can be implemented as a memory register with, for example, 2 bytes of storage capacity. In contrast, a larger memory, such as a FIFO buffer memory, is not required. The sensor device can thus be configured to be simple and compact and thus also cost-effective.

The sensor device can be implemented as an integral circuit, for example on a piece of silicon. This allows to further improve the degree of compactness and simplicity as well as the pricing.

In an embodiment, the time interval and thus the duration of a measurement process is adjustable. In particular, the time interval and thus the duration of a measurement process can be adjustable via a communication interface of the sensor device. The measurement accuracy can be improved by longer time intervals.

The display signal can correspond to a first value of a digital signal. The digital signal may be an interrupt signal. The sensor device may, for example, have an output or pin, in particular an interrupt output or an interrupt pin, at which the display signal is output as a first value, for example "LOW", of a digital signal. If no display signal is to be present, the digital signal present at the output can, in contrast, comprise a second value, for example "HIGH". The output of the display signal as a first value of the digital signal at an output of the sensor device is advantageous, since it is possible to switch very quickly between the first value and the second value.

The signal detection device can output a second value of the digital signal different from the first value outside a period of time during which the display signal corresponding to the first value is output.

According to a further embodiment, the signal detection device is configured to change the first value to the second value as soon as the at least one, such as exactly one signal value is at least partially read out from the memory. It may be provided that after the signal value has been read out, the memory is erased. It can also be provided that after the signal value has been read out, the signal value determined in the subsequent time interval is stored, overwriting the signal value stored in the previous time interval.

The sensor device and in particular the signal detection device can be configured to output the display signal via a communication interface, in particular an interrupt output, of the sensor device. It can thus be easily determined by an external device, such as an external control device, that a signal value can or should be read out.

According to an embodiment, the sensor device and in particular the signal detection device is configured to store in the memory only the at least one, such as exactly one signal value of the respective current time interval. The memory can thus be kept small.

The sensor device, and in particular the signal acquisition device, may be configured to erase or overwrite the signal value from a previous time interval from memory.

A detector, in particular for detecting light flicker, may include an optoelectronic sensor device. The detector further comprises a control device in communication with the sensor device. The control device may be adapted to read out the at least one signal value of a respective time interval. Furthermore, the control device can be configured to determine a flicker frequency of the detected light, in particular using an FFT method or quadrature detection, using the signal values of a plurality of time intervals. FFT stands for FAST-FOURIER-TRANSFORM and refers to a well-known method for calculating frequency components from the determined signal values.

The control device can define the time interval, in particular by means of a communication interface between the sensor device and the control device. The time interval can thus be adapted to desired requirements. The longer the time interval is selected, the less noise is present. A shorter time interval, on the other hand, allows faster measurements.

The control device can be configured to detect the display signal, in particular by means of a communication interface, such as an interrupt output, between the sensor device and the control device, and to read out the at least one signal value from the memory of the sensor device in response to the detection of the display signal. The control device can thus read out the memory after receiving the indication signal.

The control device can be configured to collect or store the read signal values from several successive time intervals. A downstream analysis can thus be performed using the signal values from several time intervals.

The control device can be configured to determine a flicker frequency for the detected light as a function of the signal values of several successive time intervals. In particular, an FFT method or a quadrature detection method can be used here.

An electronic device, in particular a portable electronic device, may have an optoelectronic sensor device, or having a detector, wherein a detector surface of the optoelectronic detection device is arranged in a housing of the electronic device in such a way that light incident from the outside can be detected by means of the detector surface.

The electronic device may be a cell phone, smartphone, tablet, or camera. As previously discussed, the electronic device may have a flicker frequency of ambient light detected. The electronic device may include a camera for capturing an image or video. The image capture frequency used for image or video capture may be synchronized with the flicker frequency. The effect of "banding" can thus be avoided or at least reduced.

A method of operating an optoelectronic sensor device may include:
  an electrical signal is provided during a repetitive time interval, the electrical signal being generated in response to detected light,
  during the time interval at least one signal value of the electrical signal is stored in the memory, and the display signal is output after the time interval has elapsed.

A method of operating an optoelectronic detector may include:
- the sensor device after the time interval has elapsed outputs the display signal,
- the control device detects the display signal and, in response to the detection of the display signal, reads out the at least one signal value from the memory of the sensor device,
- after reading out, the display signal is not displayed until the next time interval has elapsed, and
- during the next time interval again at least one signal value of the electrical signal is stored in the memory.

The term light is to be understood broadly and refers in particular to electromagnetic radiation in general. In particular, the term light may include infrared and/or ultraviolet light in addition to visible light.

BRIEF DESCRIPTION OF THE DRAWINGS

In the following, embodiments are explained in more detail with reference to the accompanying drawings. They show, schematically in each case, FIG. 1 a block diagram of a detector with a sensor device and a control device, FIG. 2 block diagram of a detector with a sensor device and a control device, and FIG. 3 time lapse diagram of a sensor device.

DETAILED DESCRIPTION

Figure 1:
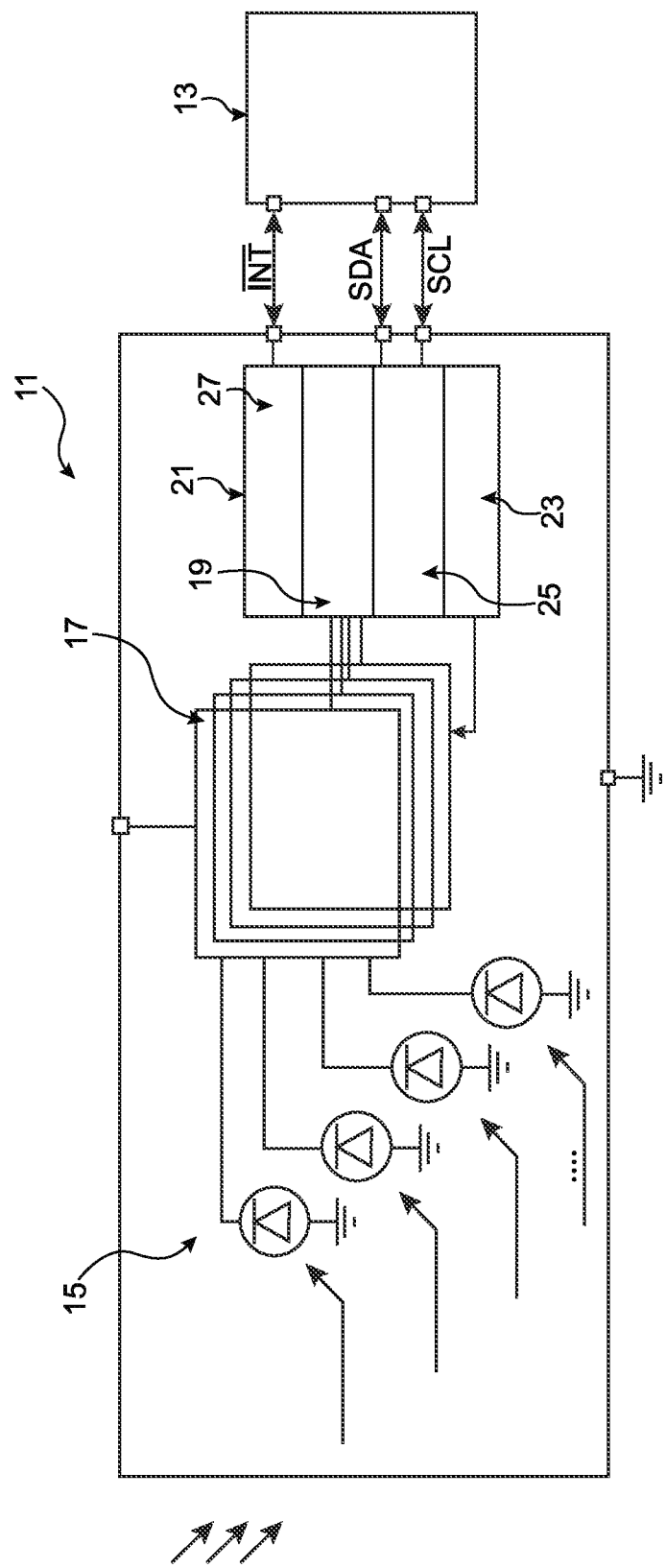

The detector shown in FIG. 1 comprises an optoelectronic sensor device 11 and a control device 13 which is in communication with the sensor device 11. Both the sensor device 11 and the control device 13 may be implemented in a respective chip.

The sensor device 11 includes an optoelectronic detection device 15, in this case in the form of a plurality of photodiodes, each having a detector surface for detecting light. Each photodiode 15 can detect light of different wavelengths, for example, by arranging different color filters in front of the detector surfaces of the photodiodes 15. This enables a spectral resolution of the detected light.

Each photodiode 15 generates an electrical signal in response to the light detected by the photodiode 15, which is provided to a signal conditioning circuit 17 associated with the respective photodiode 15. In a respective signal conditioning circuit 17, the signal provided by the associated photodiode 15 can be manipulated to be suitable for analog-to-digital conversion, for example. In this regard, the signal may be processed, for example, by means of an anti-aliasing filter. Furthermore, the electrical signal can be converted into a digital signal value in the respective signal conditioning circuit 17.

The sensor device 11 may have a signal detection device 21 comprising at least one data memory 19. A respective digital signal value can be stored in the data memory 19. Signal values from different photodiodes 15 may be stored in different data memories 19, in particular memory registers.

The signal detection device 21 may include an optional command register 23 in which commands for controlling the signal conditioning circuits 17 may be stored and applied.

The signal detection device 21 comprises a communication interface 25 by means of which communication with the control device 13 can take place. The communication interface 25 may be an I2C interface that enables communication via clock (SCL) and data (SDA) lines. I2C stands for Inter-Integrated Circuit.

In addition, the signal detection device 21 includes an interrupt output 27, also called an interrupt pin, through which an interrupt signal INT can be output, which in turn can be detected by the control device 13.

Figure 2:
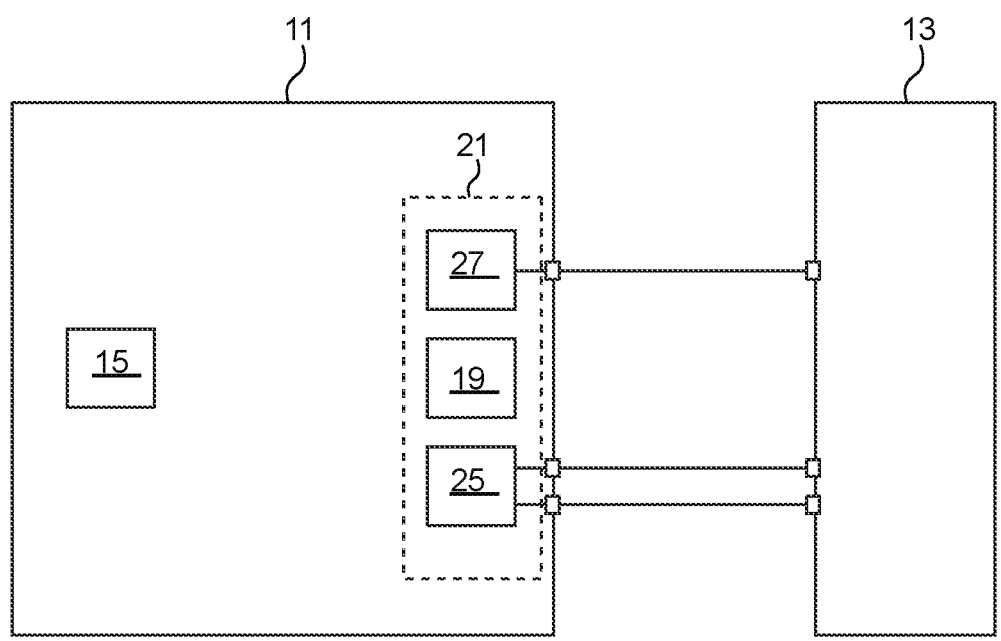

The detector, shown in a block diagram in FIG. 2, comprises a sensor device 11 and a control device 13, which is in communication with the sensor device 11. Both the sensor device 11 and the control device 13 may be implemented as a chip. For example, the sensor device 11 may be implemented as an integral circuit in a silicon chip.

The sensor device 11 comprises an optoelectronic detection device 15, for example in the form of one or more photodiodes or in the form of a photodiode array. The detection device 15 is configured to detect light and provides an electrical signal as a function of detected light. For example, a photodiode generates an electrical current as a function of the intensity of light absorbed by the photodiode. Furthermore, the detection device 15 may comprise an analog-to-digital converter so that the electrical signal can be provided in the form of an instantaneous signal value.

A signal detection device 21 is provided for storing a signal value of the electric signal in a memory 19 during a time interval of repetitive time intervals. For determining a flicker frequency, for example, if several photodiodes are present per time interval, the signal value of that photodiode can be stored which detects light in a wavelength range which is at or at least near the maximum of the spectral brightness sensitivity of the human eye in daylight. Thus, a kind of photopic response can be detected.

After the time interval has elapsed, the signal detection device 21 outputs an indication signal via an interrupt output 27 which can be received by the control device 13. The indication signal is a first state, such as the low state, of an interrupt signal which is otherwise output in its second state, such as its higher state.

The control device 13 can communicate with the sensor device 11 via the communication interface 25. In particular, the control device 13 can determine the length of the time interval and read the signal value stored in the memory 19 during a time interval.

Figure 3:
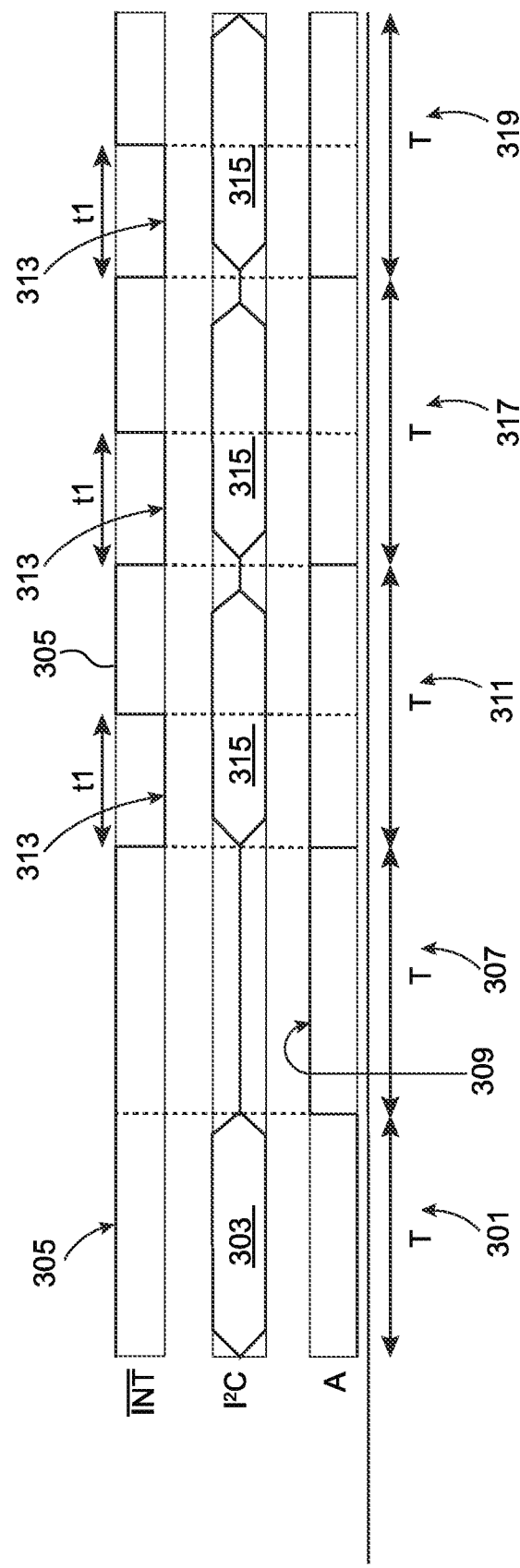

FIG. 3 illustrates the operation of the sensor device 11 in a time lapse diagram over several successive time intervals T. In the bottom line A, the state of the sensor device 11 is indicated. In the middle line I2C, a communication is indicated via the communication interface 25, which is an I2C communication interface. In the top line the signal INT at the interrupt output 27 is displayed.

During the first time interval T, 301 the control device 13 is in an idle mode, also referred to as standby mode. Communication 303 between the control device 13 and the sensor device 11 starts via the communication interface 25. A normal state 305 of the interrupt signal is indicated at the interrupt output 27 (cf. INT), here in the form of a high signal level.

During the 2nd time interval T, 307 a measurement takes place (see "Measurement in progress" 309 in the 3rd line of FIG. 3). During this time interval 307, a determined signal value of the electrical signal is stored in the memory 19.

After the 2nd time interval 307 has elapsed and thus at the beginning of a subsequent 3rd time interval 311, the display signal 313 is output at the interrupt output 27 (INT) by switching the output interrupt signal from the normal state (see INT, 305) to a state with a low signal level. This state 313 remains for a time duration t1. The time duration t1 may correspond to a period of time required to read out from memory a first byte of the signal value determined during the 2nd time interval 307.

After the time period t1 has elapsed, the state at the interrupt output 27 changes back to the normal state 305. INT thus returns to the normal state 305 with a high signal level. As shown in the 2nd line in FIG. 3, a data transmission 315 between the control device 13 and the sensor device 11 to read out all bytes of the signal value from the previous time interval may extend over a large part of the subsequent time interval. For example, the time period t1 may be approximately half as long as the duration of the data transmission 315.

The above process is repeated accordingly for the subsequent time windows, for example a fourth and fifth time window 317 and 319. The measurement process ends with a corresponding command from the control device 13 to the sensor device 11 (not shown).

The control device 13 or a downstream device can collect the signal values measured over several time intervals T and process them further. For example, an FFT method can be used to calculate any flicker frequency of the detected light. The maximum possible flicker frequency that can be determined results from the inverse of twice the time duration ($f_{max}=1/(2*T)$).

REFERENCE LIST 11 sensor device
13 control device
15 detection device, photodiode
17 signal conditioning circuit
19 data storage
21 signal acquisition device
23 command register
25 communication interface
27 interrupt output
301 first time interval
303 communication starts
305 normal state
307 second time interval
309 measurement running
311 time interval
313 Display signal
315 Data transmission
317 fourth duration
319 fifth period
INT Interrupt signal
SCL clock line
SDA data line
T time interval
t1 Duration
t2 Duration

The invention claimed is:

1. An optoelectronic sensor device comprising:
an optoelectronic detection device configured to detect light and configured to provide an electrical signal as a function of detected light based on a detected light intensity;
a communication interface; and
a signal detection device configured to store at least one signal value of the electrical signal in a memory during a time interval of repetitive time intervals and to output a display signal over the communication interface after the time interval has elapsed.

2. The optoelectronic sensor device according to claim 1, wherein
the time interval is adjustable.

3. The optoelectronic sensor device according to claim 1, wherein
the display signal corresponds to a first value of a digital signal.

4. The optoelectronic sensor device according to claim 3, wherein
the sensor device is configured to output a second value of the digital signal different from the first value, outside a time period during which the display signal corresponding to the first value is output.

5. The optoelectronic sensor device according to claim 3, wherein
the sensor device is adapted to change the first value into a second value as soon as at least one byte of the signal value is read out from the memory.

6. The optoelectronic sensor device according to claim 1, wherein
the signal detection device is configured to store at least one value of the respective current time interval in the memory.

7. The optoelectronic sensor device according to claim 6, wherein
the signal detection device is configured to delete or overwrite the at least one value from a preceding time interval from the memory.

8. The optoelectronic sensor device according to claim 1, wherein
the display signal corresponds to a first value of a digital signal; and
the sensor device is configured to change the first value to a second value as soon as at least one byte of the signal value is read out from the memory.

9. The optoelectronic sensor device according to claim 1, wherein
the sensor device is configured to store exactly one signal value per time interval in the memory.

10. The optoelectronic sensor device according to claim 1, wherein
the memory is a memory register.

11. A detector comprising:
an optoelectronic sensor device according to claim 1; and
a control device in communication with the sensor device.

12. The detector according to claim 11, wherein
the control device is configured to determine the time interval.

13. The detector according to claim 11, wherein:
the control device is configured to detect the display signal between the sensor device and the control device; and
in response to the detection of the display signal, the control device is configured to read out the at least one signal value from the memory of the sensor device.

14. The detector according to claim 13, wherein
the control device is configured to collect the read-out signal values from several successive time intervals.

15. The detector according to claim 1, wherein
the control device is configured to determine a flicker frequency for the detected light as a function of the signal values of a plurality of successive time intervals.

16. An electronic device comprising:
an optoelectronic sensor device according to claim 1;
a housing;
wherein the optoelectronic detection device is arranged in the housing in such a way that light incident from outside is detectable.

17. The electronic device according to claim 16, wherein the electronic device
is a cell phone, smartphone, tablet, or camera.

18. A method of operating an optoelectronic sensor device according to claim 1,
wherein:
an electrical signal is provided during a repetitive time interval, the electrical signal being generated in response to the detected light intensity;
during the time interval at least one signal value of the electrical signal is stored in the memory; and
the display signal is output over the communication interface after the time interval has elapsed.

19. A method of operating a detector according to claim 11, wherein:
the sensor device is configured to output the display signal after the time interval has elapsed,
the control device is configured to detect the display signal; and
in response to the detection of the display signal, the control device is configured to read out the at least one signal value from the memory of the sensor device;
after reading out, the display signal is not displayed until the next time interval has elapsed; and
during the next time interval again at least one or exactly one signal value of the electrical signal is stored in the memory.

\* \* \* \* \*